United States Patent
Hoffman et al.

(10) Patent No.: US 12,092,093 B2
(45) Date of Patent: Sep. 17, 2024

(54) APPARATUS AND METHOD FOR CRYOGENIC PUMP COOLDOWN

(71) Applicant: Air Products and Chemicals, Inc., Allentown, PA (US)

(72) Inventors: Steven W. Hoffman, Layfayette, CA (US); David Jonathan Chalk, Slatington, PA (US); Joseph P. Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 287 days.

(21) Appl. No.: 17/689,377

(22) Filed: Mar. 8, 2022

(65) Prior Publication Data

US 2023/0287875 A1   Sep. 14, 2023

(51) Int. Cl.
  *F04B 39/06*   (2006.01)
  *F04B 37/08*   (2006.01)
  (Continued)

(52) U.S. Cl.
  CPC .............. *F04B 39/06* (2013.01); *F04B 37/08* (2013.01); *F04B 49/03* (2013.01); *F04B 53/06* (2013.01);
  (Continued)

(58) Field of Classification Search
  CPC .......... F04B 39/06; F04B 37/08; F04B 49/03; F04B 53/06; F04B 2205/10; F04B 2205/11; F04B 53/08; F04B 2015/0822; F04B 53/143; F04B 15/08; F04B 39/064; Y02E 60/32; F17C 7/02; F17C 9/00;
  (Continued)

(56) References Cited

U.S. PATENT DOCUMENTS 3,630,639 A * 12/1971 Duron .................... F04B 15/08
                                                       417/435
4,576,557 A *  3/1986 Pevzner ............... F04B 53/164
                                                       92/170.1
(Continued)

FOREIGN PATENT DOCUMENTS

CN   110429300 A   11/2019
CN   111765064 A   10/2020
(Continued)

OTHER PUBLICATIONS

Cooldown and Startup, Feb. 27, 2018, "Cryo-Mach" (Year: 2018).*
Corresponding JP Application Office Action (with English translation), dated Apr. 1, 2024, 12 pgs.

*Primary Examiner* — Charles G Freay
*Assistant Examiner* — Benjamin Doyle
(74) *Attorney, Agent, or Firm* — Matthew R. Weaver

(57) ABSTRACT

An apparatus and process for cooling down a liquid hydrogen or other cryogenic fluid pump can be configured to allow for a quick startup that also helps minimize hydrogen losses. Some embodiments can utilize a blow-by circuit configured and arranged to support the cryogenic cooldown operation for the pump that can minimize hydrogen loss while allowing substantially improved pump startup times. Some embodiments can utilize at least one temperature sensor to monitor temperature and an adjustable control valve that can facilitate the flow of the fluid utilized to perform the cooldown of the pump.

9 Claims, 4 Drawing Sheets

(51) Int. Cl.
*F04B 49/03* (2006.01)
*F04B 53/06* (2006.01)

(52) U.S. Cl.
CPC ....... *F04B 2205/10* (2013.01); *F04B 2205/11* (2013.01)

(58) Field of Classification Search
CPC ............ F17C 13/026; F17C 2205/0352; F17C 2205/0388; F17C 2221/012; F17C 2223/0161; F17C 2223/033; F17C 2227/015; F17C 2250/0439; F17C 2265/031
USPC ........................................................ 417/366
See application file for complete search history.

(56) References Cited

U.S. PATENT DOCUMENTS

| | | | |
|---|---|---|---|
| 4,679,401 A * | 7/1987 | Lessard | F04B 37/08 |
| | | | 62/100 |
| 5,156,007 A * | 10/1992 | Bartlett | F25D 19/006 |
| | | | 62/55.5 |
| 5,243,821 A * | 9/1993 | Schuck | F17C 7/04 |
| | | | 62/50.1 |
| 5,520,000 A * | 5/1996 | Pevzner | F17C 7/02 |
| | | | 62/48.1 |
| 5,537,828 A * | 7/1996 | Borcuch | F17C 7/02 |
| | | | 62/50.1 |
| 6,143,234 A * | 11/2000 | Van Horn | B29C 49/78 |
| | | | 264/528 |
| 6,401,767 B1 | 6/2002 | Cohen et al. | |
| 6,474,078 B2 * | 11/2002 | Chalk | F17C 13/028 |
| | | | 62/50.7 |
| 6,619,336 B2 | 9/2003 | Cohen et al. | |
| 6,708,573 B1 | 3/2004 | Cohen et al. | |
| 6,745,801 B1 | 6/2004 | Cohen et al. | |
| 6,786,245 B1 | 9/2004 | Eichelberger et al. | |
| 7,028,724 B2 | 4/2006 | Cohen et al. | |
| 7,328,726 B2 | 2/2008 | Cohen et al. | |
| 7,793,675 B2 | 9/2010 | Cohen et al. | |
| 7,921,883 B2 | 4/2011 | Cohen et al. | |
| 8,020,589 B2 | 9/2011 | Cohen et al. | |
| 8,286,675 B2 | 10/2012 | Farese et al. | |
| 8,365,777 B2 | 2/2013 | Farese et al. | |
| 8,453,682 B2 | 6/2013 | Bonner et al. | |
| 8,899,278 B2 | 12/2014 | Cohen et al. | |
| 8,915,719 B2 * | 12/2014 | Street | F04B 19/06 |
| | | | 417/264 |
| 9,074,730 B2 | 7/2015 | Cohen et al. | |
| 9,151,448 B2 | 10/2015 | Cohen et al. | |
| 9,261,238 B2 | 2/2016 | Cohen et al. | |
| 9,279,541 B2 | 3/2016 | Cohen et al. | |
| 9,404,620 B2 | 8/2016 | Cohen et al. | |
| 9,494,281 B2 * | 11/2016 | Chalk | F04D 29/584 |
| 9,863,583 B2 | 1/2018 | Youlio et al. | |
| 10,502,649 B1 | 12/2019 | Cohen et al. | |
| 10,508,770 B2 | 12/2019 | Cohen et al. | |
| 2002/0083719 A1 * | 7/2002 | Hughes | F17C 5/02 |
| | | | 62/53.2 |
| 2003/0080512 A1 * | 5/2003 | Colson | F04B 53/143 |
| | | | 277/404 |
| 2004/0182470 A1 * | 9/2004 | White | F17C 5/00 |
| | | | 141/11 |
| 2007/0028628 A1 * | 2/2007 | Chalk | F04B 15/08 |
| | | | 62/50.7 |
| 2007/0186566 A1 * | 8/2007 | Allidieres | F04B 23/02 |
| | | | 62/50.6 |
| 2007/0227614 A1 | 10/2007 | Kurita et al. | |
| 2011/0070103 A1 * | 3/2011 | Allidieres | F04B 15/08 |
| | | | 417/307 |
| 2014/0096540 A1 | 4/2014 | Foster | |
| 2018/0058441 A1 | 3/2018 | Wells | |
| 2018/0112826 A1 * | 4/2018 | Popadiuc | F17C 13/001 |
| 2020/0274177 A1 * | 8/2020 | Suzuki | H01M 8/04201 |
| 2022/0163030 A1 * | 5/2022 | Takahashi | F04B 37/08 |
| 2023/0067726 A1 * | 3/2023 | Light | B01F 23/042 |

FOREIGN PATENT DOCUMENTS

| | | |
|---|---|---|
| CN | 213116590 U | 5/2021 |
| DE | 20201100432 U1 | 6/2011 |
| EP | 1247980 A2 | 10/2002 |
| JP | 2018076894 A | 5/2018 |

* cited by examiner

APPARATUS AND METHOD FOR CRYOGENIC PUMP COOLDOWN

FIELD OF THE INVENTION

The innovation relates to apparatuses and methods for cooling a pump that can be positioned and configured to use a cryogenic fluid (e.g. liquid hydrogen, liquid oxygen, liquid nitrogen, liquid helium, etc.).

BACKGROUND OF THE INVENTION

Examples of hydrogen generation and supply systems can be appreciated from U.S. Pat. Nos. 6,401,767, 6,474,078, 6,619,336, 6,708,573, 6,745,801, 6,786,245, 7,028,724, 7,328,726, 7,793,675, 7,921,883, 8,020,589, 8,286,675, 8,365,777, 8,453,682, 8,899,278, 9,074,730, 9,151,448, 9,261,238, 9,279,541, 9,404,620, 9,863,583, 10,502,649, and 10,508,770.

Some hydrogen fueling applications can utilize a liquid hydrogen pump. Examples of such pumps can be appreciated from U.S. Patent Application Publication Nos. 2007/0227614, and 2018/0058441 and Chinese Patent Publication Nos. CN 111765064A and CN 110429300A and Chinese Utility Model CN 213116590 U.

As disclosed in U.S. Pat. No. 5,537,828, before a cryogenic pump can pass cryogenic liquid from a low pressure storage tank to high pressure storage tank, it can be cooled down to the appropriate cryogenic temperature to help minimize liquid vaporization before it reaches the pump. A cryogenic pump typically will not operate well with vapor or even a mixture of liquid and vapor.

One solution that has been utilized to address this problem is to submerge the pump in a low temperature fluid to ensure it remains at liquid hydrogen temperature. U.S. Pat. No. 6,474,078 discloses this technique, for example.

U.S. Patent Application Publication No. 2014/0096540 discloses a pump for delivery of liquefied natural gas (LNG) from a dispensing station. The cryogenic LNG needs to flow through the pumping system continuously in order to maintain the pump parts at a low enough temperature to avoid cold shock or differential heating of the impellers.

SUMMARY

We determined that a new method and apparatus for cryogenic pump cooldown operation is needed to help minimize loss of a cryogenic fluid (e.g. hydrogen) while also reducing the amount of time that is needed to start the pump. Some embodiments can permit startup times to be as short as two minutes or less than two minutes while also substantially reducing loss of hydrogen fuel (e.g. some embodiments can reduce hydrogen loss by more than 50%, for example). In some implementations, a pump can undergo a cooldown operation that is performed before the pump is operated to help drive a flow of fluid toward a dispenser, flow control manifold, or other downstream unit. Embodiments can be configured so that the cooldown period may take longer than in conventional situations, but allow the pump start-up process to occur much more quickly so that the overall time period required for starting of operation of the pump is greatly reduced. The cooling down of the pump and the maintenance of the pump at this cooled down temperature can be provided in such a way that the pump can be started quickly (e.g. within 5 minutes, less than five minutes but more than 5 seconds, up to 2 minutes, up to 3 minutes, between 10 seconds and 2.5 minutes, between 5 seconds and 4 minutes, etc.). Embodiments can be provided so that the pump temperature can be maintained at a desired cooled temperature with minimal losses of hydrogen that can also avoid having to submerge the pump in liquid hydrogen. Embodiments can also be configured so that this cooled temperature of the pump can be maintained while also avoiding the need to vent conduits downstream of the pump prior to operation of the pump.

Embodiments can be provided for reducing hydrogen losses for cryogenic hydrogen pump (CHP) systems or other cryogenic fluid pump systems. For example, some embodiments can reduce hydrogen losses by reducing the vented volume required for cooldown of the pump. Embodiments can also facilitate the starting of the pump with a pressurized discharge line which reduces losses and startup time. Embodiments can also allow for faster start times making direct filling of vehicles possible, which can minimize the need for gaseous storage or a secondary pre-cooling system for a fueling station. We believe that embodiments can additionally provide efficient cooling by flowing gas along the discharge pathway internal to the pump that can permit a significant reduction in lost hydrogen as compared to pumps that are fully submerged to maintain their temperature in an attempt to provide what is conventionally considered to be a quick start operation.

Some embodiments can utilize a blow-by circuit to support cooldown operations by utilization of a control valve that can allow a flow of fluid to atmosphere. In a preferred embodiment, the control valve can be an air operated control valve that allows fluid to vent to the external environment that is at atmospheric pressure, for example. This cooldown time period can take a significant amount of time depending on the temperature of the pump at the time the cooldown operation was initiated. In some situations where the pump is at ambient temperature, the cooldown operation can take up to two hours. Once the pump is at the cooled temperature, the pump can then be maintained at this temperature to facilitate quick startup (e.g. between 5 seconds and 5 minutes of time, in less than 3 minutes, in less than 2 minutes, between 5 seconds and 2.5 minutes of time, between 10 seconds and 3 minutes of time, etc.). In other situations, the pump can be cooled down quickly so that the cooldown process takes a short period of time. The pump can then undergo a startup operation after being cooled down to its operational temperature within a short period of time (e.g. between 5 seconds and 5 minutes of time, in less than 3 minutes, in less than 2 minutes).

At least one temperature sensor can also be utilized to help monitor temperature of the pump. In some embodiments, the one or more temperature sensors can include a first temperature sensor that can be positioned to monitor the temperature of the pump at or near an outlet of the pump. A second temperature sensor can also be provided to monitor the temperature elsewhere within the pump (e.g. a sensor near or at a feed inlet to the pump). This temperature sensor can help monitor temperature of the hydrogen or other cryogenic fluid fed for the cooldown operation to help verify the flow is sufficiently cold to provide a desired cooldown operation. Examples of temperature sensors TE can include thermocouples or other suitable types of temperature sensors.

Some embodiments can utilize an apparatus that is configured to permit liquid hydrogen fuel and/or a very cold gas (e.g. cryogenic hydrogen gas within a storage tank) to pass through a pump to the inlet of the pump when the pump is not operating. A blow-by circuit to atmosphere or other venting arrangement can be coupled to the pump and opened when the pump is not operating and the cooling fluid is passed therethrough for cooldown of the pump to help drive the flow of the fluid through the pump at a pre-selected rate that is preferably a slow rate, or low rate. Once the pump is determined to be at or below the pre-selected operational temperature and that there is demand for the fluid at the dispenser, the pump can be started. In some embodiments, the starting of the pump can occur near instantly (e.g. within a few minutes, in less than two minutes, within a range of 0.25 minutes to 2 minutes or within a range of 1-30 seconds, etc.) without venting downstream piping or flowing product through the pump to atmosphere (although this functionality can still be provided by the blow-by circuit or other venting arrangement for use in the event it may be needed due to unexpected performance issues, a component failure, etc.). In some embodiments, this greatly enhanced pump startup time can occur because of the cooldown process used to cool the pump to its operational temperature. In other embodiments, this greatly enhanced pump startup time can be provided by the utilization of liquid and/or gas cryogenic flows outputtable from a storage tank that is in fluid communication with the pump.

Other embodiments can be configured so that a cylinder of the pump is sized and configured to allow for cold gas (e.g. a cryogenic gas), liquid hydrogen, or other cold fluid (e.g. cryogenic fluid such as cryogenic oxygen, cryogenic helium, cryogenic nitrogen or cryogenic hydrogen) to cool the pump through a parallel pathway in the cylinder of the pump. This parallel pathway can be used independently, not at all, or in conjunction with a primary flow path defined to pass the cooling fluid around piston rings. This additional pathway for the cooling fluid can be used to offset variations in ring wear or if the idle piston position of the pump limited flow through the pump, for example.

An apparatus for hydrogen storage and distribution is provided. The apparatus can include a pump positioned to receive hydrogen from at least one storage tank. The pump can have a pump discharge outlet for a pump discharge conduit through which a liquid is passable out of the pump. The pump can also have a compression cavity and a moveable piston moveable within the compression cavity. The pump can also have piston rings positioned adjacent the compression cavity and the moveable piston. The piston rings and the compression cavity can be positioned and configured so that hydrogen gas is passable into the compression cavity while the piston is stationary and is passable from the compression cavity through the piston rings to a cooling flow outlet configured to be in fluid communication with a cooldown discharge conduit for venting the hydrogen gas to atmosphere.

The cooldown discharge conduit can be separate from the pump discharge conduit through which compressed liquid is passable out of the pump. For instance, fluid passed out of the pump and through the pump discharge conduit does not pass through the cooldown discharge conduit. Also, fluid passed out of the pump and through the cooldown discharge conduit may not pass through the pump discharge conduit Embodiments of the apparatus for hydrogen storage and distribution can also include the storage tank and a hydrogen feed conduit arrangement. The hydrogen feed conduit arrangement can include at least one of: (i) a liquid feed conduit connected between the storage tank and a feed inlet of the pump to supply liquid hydrogen from the storage tank to the pump, and (ii) a hydrogen gas supply conduit connected between the storage tank and a feed inlet of the pump to supply hydrogen gas from the storage tank to the pump. Embodiments of the apparatus can also include the cooldown discharge conduit. The cooldown discharge conduit can be connected to the pump so hydrogen gas passed through the cooling flow outlet is passable out of the pump and through the cooldown discharge conduit for being vented during a cooldown operation of the pump.

The cooldown discharge conduit can have an adjustable valve that is adjustable to an open position for venting the hydrogen during the cooldown operation of the pump while the pump is deactivated. The adjustable valve can also be closed to prevent venting. When closed, the cooldown discharge conduit can include a conduit segment to supply hydrogen gas passing through the conduit back to the storage tank to function as a blowby vapor return for the pump.

In some embodiments, the apparatus can include one or more temperature sensors. For example, embodiments can include at least one of: (1) a first temperature sensor connected to the pump to measure a temperature of hydrogen being fed from the storage tank to the pump; and (2) a second temperature sensor connected to the cooldown discharge conduit to monitor a temperature of the hydrogen output from the pump for passing through the cooldown discharge conduit. Embodiments can also include a controller communicatively connected to the first temperature sensor and/or the second temperature sensor to determine a difference between the temperature of the hydrogen being fed from the storage tank to the pump and the temperature of the hydrogen output from the pump and passing through the cooldown discharge conduit. The controller can include hardware (e.g. a processor connected to a non-transitory computer readable medium and at least one transceiver or interface for communication with the temperature sensor(s)). The controller can be configured to determine that the pump is at a temperature within a pre-selected operational temperature range and determine that the pump is activatable to feed hydrogen toward a dispenser in response to determining that the difference is within a pre-selected pump operational temperature threshold.

The controller can be configured to adjust valves of the hydrogen feed conduit arrangement and communicate with a pump drive motor to turn the pump on in response to determining that the pump is at the temperature within the pre-selected pump operational temperature threshold and that the difference is within a pre-selected pump operational temperature threshold.

In some embodiments, the pump can include at least one internal cooling channel positioned to pass a portion of hydrogen gas to internal pump components after the hydrogen gas has passed the piston while moving along a cooling flow path toward the cooling flow outlet. For example a cooling channel can be defined within a cylinder of the pump.

A method of performing a pump cooldown operation is also provided. Embodiments of the method can permit a quick startup of the pump. Embodiments of the method can include opening a valve of a cooldown discharge conduit connected to a pump that is in fluid communication with a storage tank so that hydrogen within the storage tank is passable into a compression cavity of the pump while the pump is deactivated. The method can also include passing the hydrogen from the storage tank and into the pump while a piston of the pump is stationary so that hydrogen gas passed into the compression cavity while the piston is stationary is passed from the compression cavity and through piston rings positioned adjacent the compression cavity and the piston. The hydrogen gas can be passed from the piston rings to the cooldown discharge conduit for being vented.

Embodiments of the method can also include other steps. For instance, the method can also include determining that the pump is cooled to a temperature that is within a pre-selected operational pump temperature range and, in response to determining that the pump is at the temperature that is within the pre-selected operational pump temperature range and that there is a demand for liquid hydrogen at a dispenser fluidly connected to the pump, closing the valve of a cooldown discharge conduit to cease venting of the hydrogen gas and turning on a pump drive motor to turn the pump on for moving the piston of the pump within the compression cavity for feeding liquid hydrogen from the storage tank toward at least one dispenser.

As another example, embodiments can also include monitoring a temperature of the hydrogen passing through a portion of the pump to measure a temperature of hydrogen being fed from the storage tank to the pump and monitoring a temperature of the hydrogen output from the pump for passing through the cooldown discharge conduit. A first temperature sensor can be connected to the pump to measure the temperature of the hydrogen passing through the portion of the pump and a second temperature sensor can be connected to the cooldown discharge conduit to measure the temperature of the hydrogen output from the pump for passing through the cooldown discharge conduit.

Embodiments of the method can utilize a controller. The controller can include hardware such as, for example, a processor connected to at least one transceiver or interface and a non-transitory computer readable medium. The controller can be communicatively connected to the first temperature sensor and/or the second temperature sensor to determine whether the pump is at or below a pre-selected pump operational temperature threshold. In response to determining that the pump is at or below the pre-selected pump operational temperature threshold, the controller can send communications for closing the valve of the cooldown discharge conduit to cease venting of the hydrogen gas.

In some embodiments, the method can also include determining a difference between the temperature of the hydrogen passing through the pump and the temperature of the hydrogen output from the pump and passed through the cooldown discharge conduit. In response to determining that (i) the difference is within a pre-selected pump operational temperature threshold, (ii) that the temperature of the hydrogen passing through the pump is within a pre-selected pump operational temperature range, and (iii) that there is a demand for liquid hydrogen at a dispenser fluidly connected to the pump, the valve of the cooldown discharge conduit can be closed to cease venting of the hydrogen and turning on a pump drive motor to turn the pump on for moving the piston of the pump within the compression cavity for feeding liquid hydrogen from the storage tank toward the dispenser.

In other embodiments, the method can include determining a temperature within the pump is within a pre-selected operational temperature range for the pump via a temperature sensor connected to the pump that is positioned such that a distal measuring point of the temperature sensor is positioned within the pump at a pre-selected detection location within the pump that is adjacent a bottom of the pump and/or a weir plate within the pump. In response to determining that the temperature within the pump is within the pre-selected operational temperature range and that there is a demand for liquid hydrogen at a dispenser fluidly connected to the pump, closing the valve of the cooldown discharge conduit to cease venting of the hydrogen gas and turning on a pump drive motor to turn the pump on for moving the piston of the pump within the compression cavity for feeding liquid hydrogen from the storage tank toward the dispenser.

A pump for a cryogenic fluid storage and distribution apparatus is also provided. Embodiments of the pump can include a piston connected to a movable piston rod for motion within a compression cavity and piston rings positioned adjacent the compression cavity and the piston. The pump can also have a pump discharge outlet for a pump discharge conduit through which cryogenic liquid is passable out of the pump. The piston rings and the compression cavity can be configured such that a cryogenic gas is passable into the compression cavity while the piston is stationary so that the cryogenic gas is passable from the compression cavity and through the piston rings toward a cooling flow outlet configured to be in fluid communication with a cooldown discharge conduit for venting the cryogenic gas.

Embodiments of the pump can include other elements. For example, the pump can include the cooldown discharge conduit and the cooling flow outlet can be in fluid communication with the cooldown discharge conduit. The cooling flow outlet can be positioned in a non-compression side of the piston in some embodiments.

The cryogenic gas that can be utilized in the pump can be (i) hydrogen gas, nitrogen gas, oxygen gas, or helium gas. In embodiments where the cryogenic gas is hydrogen gas, the liquid fed into the compression chamber of the pump can be a cryogenic liquid hydrogen. In embodiments, where the cryogenic gas is nitrogen gas, the liquid can be cryogenic liquid nitrogen. In embodiments where the cryogenic gas is oxygen, the liquid can be cryogenic liquid oxygen. In embodiments where the cryogenic gas is helium, the liquid can be cryogenic liquid helium.

The liquid passable out of the pump via the pump discharge outlet can be liquid that is pushed out of the pump via piston movement that occurs within the compression cavity when the pump is operated to drive a flow of liquid out of the pump. The liquid driven out of the pump via the pump discharge outlet may also be referred to as a compressed liquid.

In some situations, the cryogenic gas can be or can by cryogenic oxygen gas, cryogenic nitrogen gas, cryogenic helium gas or cryogenic hydrogen gas or can be vapor formed from a cryogenic liquid passed into the pump while the pump is deactivated. For example, the cryogenic hydrogen gas can be formed from cryogenic liquid hydrogen fed into the pump that is vaporized into hydrogen gas as the liquid hydrogen cools the pump. The cryogenic nitrogen gas can be nitrogen gas formed from liquid cryogenic nitrogen fed into the pump that is vaporized into nitrogen gas as the liquid nitrogen cools the pump. The cryogenic oxygen gas can be oxygen gas formed from cryogenic liquid oxygen fed into the pump that is vaporized into oxygen gas as the liquid oxygen cools the pump. The cryogenic helium gas being helium gas can be formed from cryogenic liquid helium fed into the pump that is vaporized into helium gas as the liquid helium cools the pump.

Other details, objects, and advantages of our apparatuses for hydrogen storage and distribution, apparatuses for cooling a pump that can be positioned and configured to facilitate hydrogen fuel dispensing and/or storage, apparatus for pump cooling for cryogenic operation of the pump, and methods of making and using the same will become apparent as the following description of certain exemplary embodiments thereof proceeds.

BRIEF DESCRIPTION OF THE DRAWING

Exemplary embodiments of apparatuses for hydrogen storage and distribution, apparatuses for cooling a pump that can be positioned and configured to facilitate hydrogen fuel dispensing and/or storage, apparatuses for pump cooling for cryogenic operation of the pump, and methods of making and using the same are shown in the drawings included herewith. It should be understood that like reference characters used in the drawings may identify like components.

DETAILED DESCRIPTION

Figure 1:
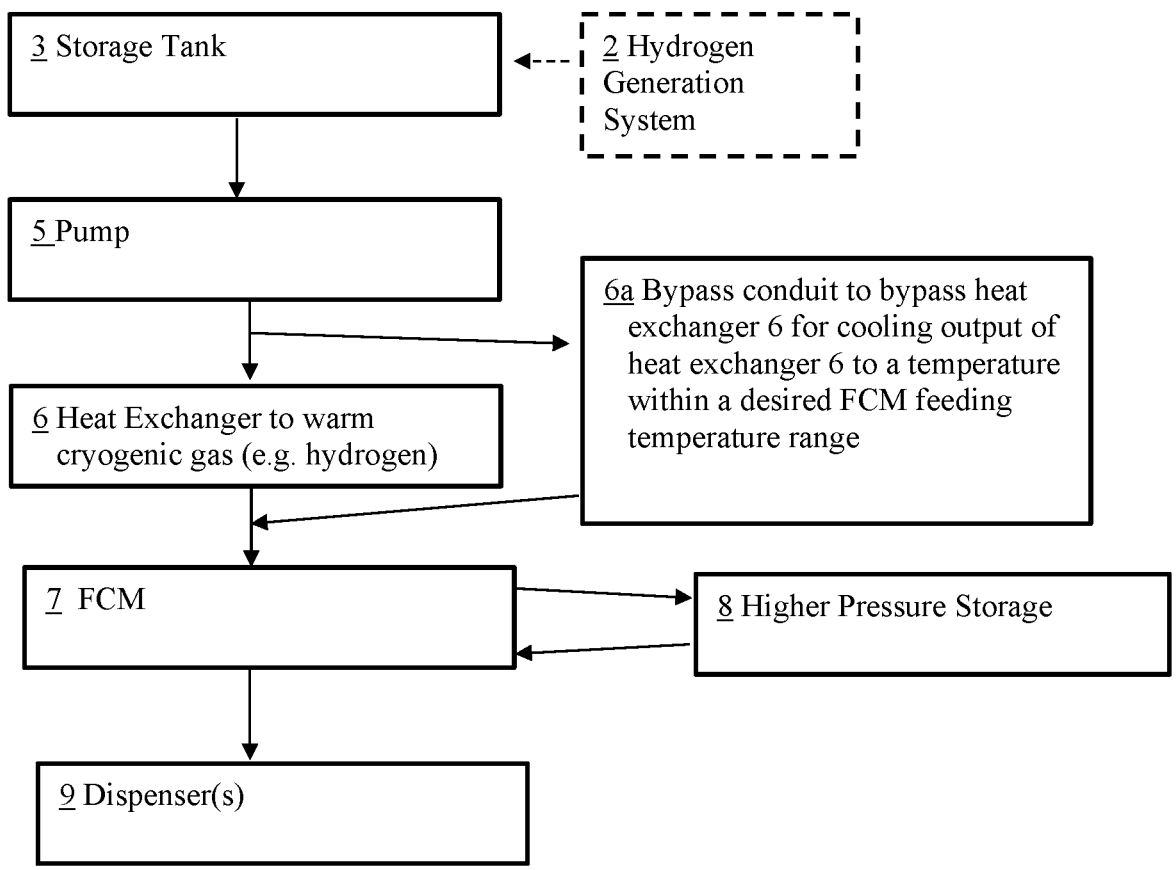
FIG. 1 is a schematic block diagram of a first exemplary embodiment of a hydrogen fuel dispensing and storage apparatus.

Referring to FIGS. 1-4, a hydrogen fuel dispensing and storage apparatus can include a storage tank 3 that is configured to store liquid hydrogen therein at a pre-selected pressure. The hydrogen stored in the storage tank can be fed via one or more trailers that may have transported liquid hydrogen to a facility for storage in the tank, a pipeline, or an on-site hydrogen generation system 2 (shown in broken line).

The hydrogen generation system 2 can include, for example, an ammonia cracker system having at least one ammonia ($NH_3$) cracker system for cracking ammonia to form hydrogen gas or a methane reformer system having at least one methane reformer that reforms methane to form hydrogen ($H_2$). The hydrogen generation system 2 can be configured to utilize a purification system or gas separation system to separate formed hydrogen gas from other gas (e.g. nitrogen, carbon dioxide, etc.). Such purification systems can include, for example, a pressure swing adsorption system (PSA) and/or a temperature swing adsorption system (TSA). Other types of purification systems can alternatively, or also, be utilized. In some embodiments, the hydrogen gas output from the hydrogen generation system 2 can be purified so that the hydrogen output from the hydrogen generation system is at least 99.5 mole % (mol %) hydrogen, or at least 99.7 mol % hydrogen (e.g. within a range of between 99.7 mol % hydrogen to 99.999 mol % hydrogen. The hydrogen output from the hydrogen generation system 2 or received from that system can be liquefied for storage in the storage tank 3 or liquefied for transport for delivery and storage in a storage tank 3 at a fueling station site.

The storage tank 3 can include a vessel or a plurality of vessels that store liquid hydrogen therein at a pre-selected storage temperature and pre-selected storage pressure. The stored hydrogen can be liquid hydrogen that is stored at a cryogenic temperature. For example, the temperature of the stored liquid hydrogen can be in a temperature range of −255° C. to −241° C., less than −255° C., in a range of less than −240° C. to −255° C., within a range of −253° C. and −241° C., or within another suitable temperature range that is able to keep the hydrogen in a liquid form while it is within a pre-selected storage pressure range. The pressure of the stored liquid hydrogen can be in a range of more than 9 to 12.07 atm, more than 1 atm to less than 12 atm, or in a range of greater than 9 atm and less than 12 atm, between 9.0 atm and 11.6 atm, or in another suitable pressure range selected to maintain the liquid hydrogen in liquid form while it is within the pre-selected storage temperature range (e.g. 0.2 MPa to 1.1 MPa, above 0.2 MPa, 0.5 MPa to 1.2 MPa, above 10 psig and below 135 psig, etc.).

Hydrogen gas 3G can be formed within the storage tank 3 while the liquid hydrogen 3L is stored therein. This hydrogen gas 3G can be vented out of the storage tank 3 to provide a cooling down of the pump 5 via a cooldown process as discussed further below. The hydrogen gas 3G can be utilized alone and/or in conjunction with a feed of the liquid hydrogen 3L to provide a cooldown operation and/or quick start operation. In other situations, the liquid hydrogen 3L can be utilized for the cooldown operation and/or quick start operation without use of the hydrogen gas 3G.

For embodiments where an on-site hydrogen generation system 2 is present, the storage tank 3 may store hydrogen output from the hydrogen generation system 2 to retain the hydrogen therein until demand for the hydrogen for at least one dispenser 9 of a fuel station results in the stored hydrogen needing to be passed out of the storage tank 3 for feeding toward one or more dispensers 9 via at least one pump 5 and a flow control manifold (FCM) 7. The hydrogen output from the hydrogen generation system can be liquefied for storage as liquid hydrogen in the storage tank 3. In other embodiments, the storage tank 3 can be configured to store hydrogen at the pre-selected storage temperature and pre-selected storage pressure to retain the liquid hydrogen therein until demand for the hydrogen for at least one dispenser 9 of a fuel station results in the stored hydrogen needing to be passed out of the storage tank 3 for feeding toward one or more dispensers 9 via at least one pump 5 and a flow control manifold (FCM) 7.

The hydrogen stored in the at least one storage tank 3 can be hydrogen that is at least 99.97 mole percent (mol %) hydrogen in some embodiments. The stored hydrogen can also include a concentration of impurities of up to 300 ppm (e.g. ranging from 0 ppm to 300 ppm) in some embodiments. The up to 300 ppm of impurities (e.g. impurities ranging from 0 ppm to 300 ppm as a cumulative total) can include water being present in a range of 0 ppm to 5 ppm, total hydrocarbons except for methane or other single carbon equivalent hydrocarbons being within a range of 0 ppm to 2 ppm, oxygen being within a range of 0 ppm to 5 ppm, methane being within a range of 0 ppm to 100 ppm, helium being within a range of 0 ppm to 300 ppm, nitrogen being within a range of 0 ppm to 300 ppm, argon being within a range of 0 ppm to 300 ppm, carbon dioxide being in a range of 0 ppm to 2 ppm, carbon monoxide being in a range of 0 ppm to 0.2 ppm, total sulfur compounds being in a range of 0 ppm to 0.004 ppm, formaldehyde being in a range of 0 ppm to 0.2 ppm, formic acid being in a range of 0 ppm to 0.2 ppm, ammonia being in a range of 0 ppm to 0.1 ppm, and halogenated compounds being up in a range of 0 ppm to 0.05 ppm.

Hydrogen stored in the storage tank 3 can be fed toward the FCM 7 for being passed to at least one dispenser 9 for being dispensed into a fuel tank of a vehicle (e.g. car, truck, boat, etc.). A hydrogen feed conduit 4 can be positioned to feed the hydrogen from the storage tank 3 to the pump 5 so that the pump 5 can increase the pressure of the hydrogen to a pre-selected hydrogen feeding pressure and help drive the flow of hydrogen from the storage tank 3 toward the FCM 7.

The liquid hydrogen output from the pump 5 can be fed to a heat exchanger 6 (e.g. a vaporizer, other type of heat exchanger, etc.) to warm the hydrogen output from the pump 5 to a pre-selected temperature that is within a pre-selected temperature range. A portion of the hydrogen output from the pump can be passed through a bypass conduit 6a to bypass the heat exchanger 6. The bypass conduit 6a can include a bypass conduit arrangement 6 *bp* that includes one or more control valves 6acv to control the portion of hydrogen output from the pump 5 that is passed through the bypass conduit 6a to bypass the heat exchanger 6. The bypassed portion can be fed to mix with the portion of hydrogen that is output from the heat exchanger 6 so that the hydrogen fed to the FCM 7 is at the pre-selected temperature or within the pre-selected temperature range. The bypassed portion can permit the heat exchanger 6 to work more efficiently be reducing the needed capacity for the heat exchanger 6 to warm the hydrogen via use of the bypassed portion. This can reduce operational costs and provide a more efficient operation of the heat exchanger 6.

In some embodiments, the bypass conduit arrangement 6*bp* for the bypass conduit 6a can include a separate refrigeration system, or chilling system, to help provide temperature control for the mixing of the hydrogen flows for feeding to the FCM and/or dispenser. While this can be utilized, it is also contemplated that embodiments can be configured so that utilization of the cooldown process discussed herein can reduce the need for a refrigeration system (e.g. permit avoidance of its use or permit a smaller sized system to be used) as a consequence of the quick start of the pump 5 and the relatively instant filling of a vehicle fuel tank that can be provided by embodiments of the pump 5 utilizing an embodiment of our cooldown process.

In yet other embodiments, a first bypass conduit 6a can be utilized for bypassing the heat exchanger for subsequent mixing with warmed hydrogen output from the heat exchanger 6. There can be a separate second conduit arrangement to provide an additional venting option as a backup or supplement to venting that can be provided by the cooldown discharge conduit 4b.

The FCM 7 can be fluidly connected between the pump 5 and at least one dispenser 9 to receive the hydrogen output from the heat exchanger 6 and/or bypass conduit arrangement 6*bp* of the bypass conduit 6a for feeding the hydrogen to at least one dispenser 9 for dispensing into a vehicle's fuel tank. Other units can be positioned between the pump 5 and the FCM 7. For example, there can be at least one heat exchanger 6 downstream of the pump 5 and upstream of the FCM 7 for warming hydrogen after the pressure of the hydrogen was increased via the pump 5 to warm the hydrogen to a pre-selected FCM feeding temperature before the hydrogen is received at the FCM.

In some embodiments, there may be a second pump (not shown) positioned to function in parallel with a first pump 5 and/or as a backup to the first pump 5. In such embodiments where the second pump is arranged to work in parallel with the first pump 5, the second pump can utilize similar flow path and conduit arrangements. For instance, there may also be a second heat exchanger (not shown) positioned between the second pump (not shown) and the FCM 7 for adjusting the temperature of the hydrogen output from the second pump before that hydrogen is received at the FCM 7. In situations where the second pump functions as a backup pump, the second pump can be connected to the same conduits as the first pump and brought online to replace the first pump due to maintenance or repair issues or other issues that may affect operation of the first pump.

There can also be higher pressure storage 8 that is in fluid communication with the FCM 7 to receive hydrogen from the FCM for storage of the hydrogen at the higher pressure after the hydrogen pressure is increased via the pump 5 and passed through the heat exchanger 6 and/or bypass for cooling the output of the heat exchanger 6. The higher pressure storage 8 can maintain the hydrogen therein at a second pressure that is higher than the first pressure of the storage tank 3. The pressure for this higher pressure storage can be set to be higher than the pressure that a vehicle tank is to be maintained to help facilitate the dispensing of hydrogen into the tank via the FCM 7 and/or dispenser 9.

The FCM 7 can be in fluid connection with one or more dispensers 9 of a fuel dispensing system for providing the hydrogen to the dispensers for dispensing into at least one fuel tank of one or more vehicles or other devices. The FCM 7 can be configured to distribute the hydrogen to one or more dispensers of a fuel station at the same time for providing hydrogen to the dispensers for feeding fuel into fuel tanks of different vehicles or other devices positioned near the dispensers receiving the hydrogen. The feeding of the hydrogen at the dispensers can occur after or before payment for the hydrogen has been provided at the fuel station or a fuel station dispenser kiosk.

Hydrogen fueling stations can often go for many hours, if not most of the day, with no use at all or a very minimal use. When in use, however, there can be great demand for the hydrogen at the fueling station. Often, abundant storage for the hydrogen fuel is provided so the station can meet the high demand when that demand is present. When a high demand condition occurs (e.g. when fueling of a vehicle is required at a fueling station, when fueling of multiple vehicle fuel tanks is to occur at a fueling station, etc.), there can be a need for a quick startup of the pump 5 to help drive the flow of hydrogen out of the storage tank 3 and toward the FCM 7 for dispensing via one or more dispensing. We determined it would be beneficial to permit a quicker pump startup so that a fueling station can more quickly adjust from a no demand situation to a high demand situation to avoid excessive delays in filing a vehicle fuel tank at the fueling dispenser(s) 9. In some embodiments, this quicker startup can be provided via use of a cooldown operation that is part of the quick start-up process that can permit the pump to be cooled to a desired operational temperature within a relatively quick time period (e.g. less than 10 minutes, less than 5 minutes, less than 2.5 minutes while also being greater than 5 seconds in duration). In other embodiments, this quicker startup time can be provided by a cooldown operation that can take a significant amount of time (e.g. up to 2 hours, over 30 minutes and less than 3 hours, etc.) that functions to put the pump 5 in a desired operational temperature so the pump can be available for a quick startup upon demand at the dispensers being present while also avoiding significant hydrogen losses that can occur via a conventional pump submergence approach. Embodiments can address high demand situations to provide quicker startups while also addressing other situations in which there is a demand at a dispenser of a fueling station that may not necessarily be considered a high demand occurrence.

We also determined that the providing of the quick startup of the pump 5 can help minimize or eliminate the need for higher pressure storage. Higher pressure storage can be relatively expensive to provide and can utilize a significant amount of space at a fueling station. Higher pressure storage can be minimized, if not eliminated, by employing a pump 5 that can be activated in a relatively quick time period (e.g. within 0.5-5 minutes of a dispenser being actuated for providing fuel to a vehicle, etc.). This advantageous feature can be particularly utilized in embodiments in which the pump 5 can remain ready to operate very quickly without having additional heat load on a cryogenic storage tank (e.g. lower pressure storage tank 3) or a significant additional heat load on the tank. For example, the maintenance of the pump at a pre-selected cooldown temperature that avoids significant hydrogen losses from hydrogen stored within the lower pressure storage tank 3 can help enhance the efficiencies provided by the quick starting feature of the pump 5.

For instance, some embodiments of the cooldown process can minimize wasted hydrogen product by first utilizing cold hydrogen gas from the storage tank 3 to cool the pump (decreased heat load by removal of the warmer vapor from the storage tank 3). This type of cooldown can also help avoid a situation where liquid hydrogen fed to the pump 5 may boil off due to a temperature of the conduits leading to the pump 5 such that the formed vapor prevents liquid from reaching the pump 5 since the vapor formed via the boiled liquid cannot get back the tank via the conduit through which the liquid is being fed. Such vapor may need to be vented (and subsequently lost) to permit the liquid to pass to the pump 5, which can decrease the heat load on the tank 3 and can provide further pump cooling. Embodiments of the cooldown process that prevent liquid from entering the pump 5 during the cooldown operation can reduce the gas that is generated and the need to vent gas formed from the liquid boiling into a vapor as it passes from the storage tank 3 to the pump 5. Such a cooldown operation can help facilitate a quick startup of the pump in an efficient, improved manner so that the pump can be quickly activated in response to demand at a dispenser 9.

Figure 2:
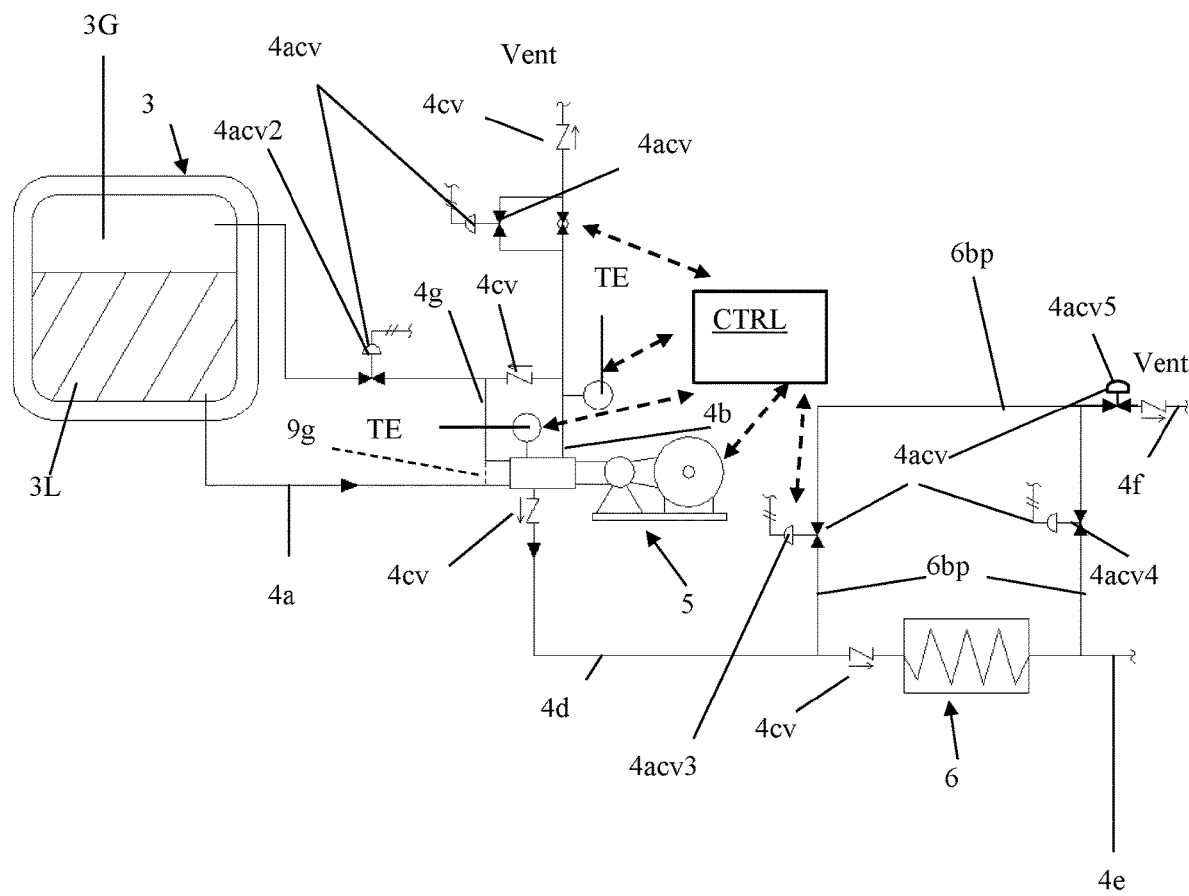
FIG. 2 is a schematic diagram of a first exemplary embodiment of an apparatus for cooling a pump 5 that can be utilized in the first exemplary embodiment of the hydrogen fuel dispensing and storage apparatus. Exemplary communicative connections the controller CTRL can have with different elements (e.g. pump 5, temperature sensors TE, control valves 4acv, etc.) is indicated in FIG. 2 via broken lines that have arrows at the terminal ends of the broken lines.
Figure 3:
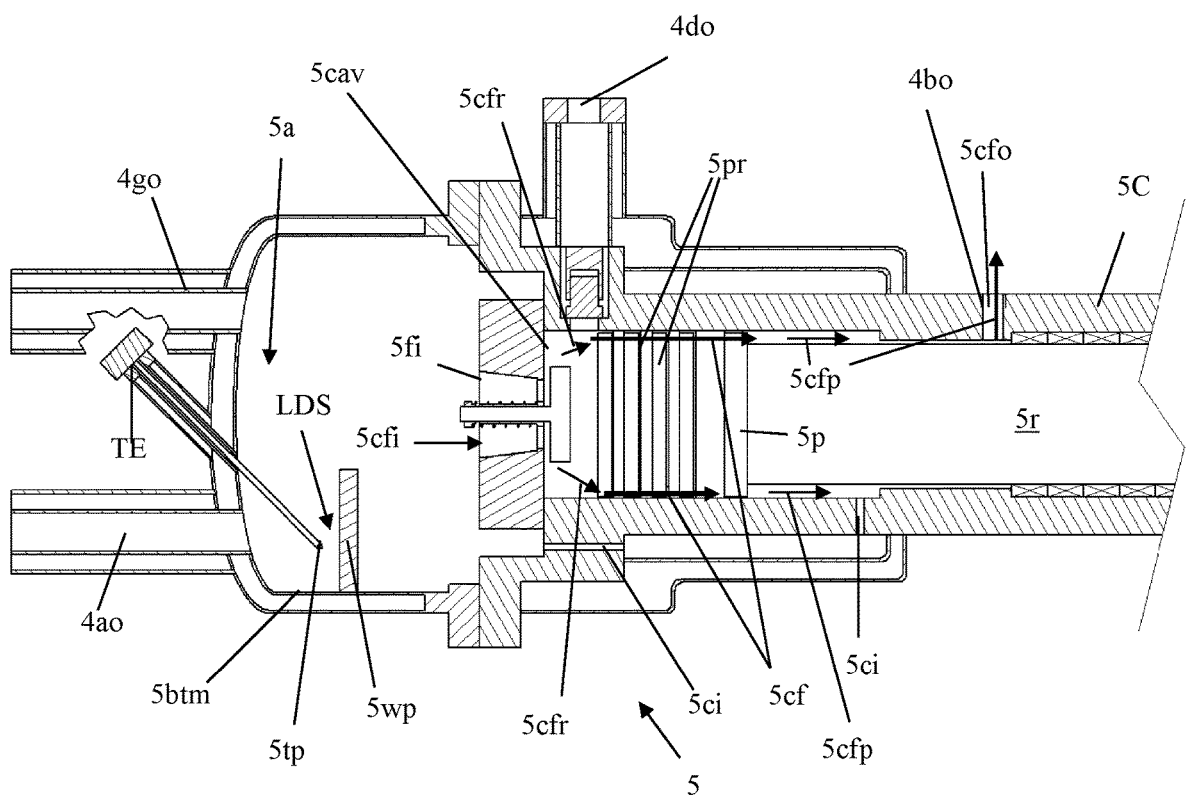
FIG. 3 is a fragmentary internal schematic diagram of the first exemplary embodiment of the apparatus for cooling a pump illustrated in FIG. 2 in which the pump 5 of the apparatus is configured as a horizontal pump.
Figure 4:
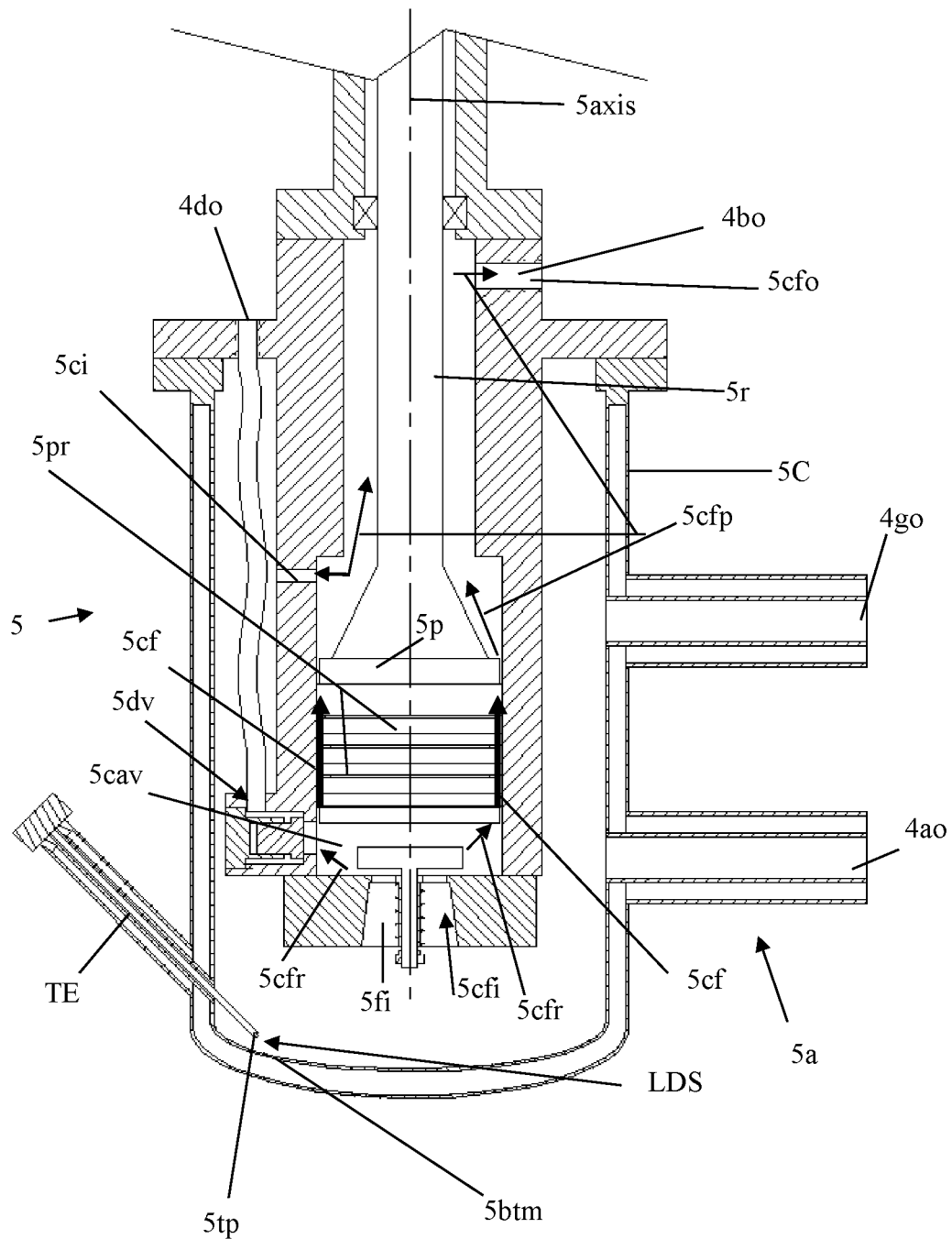
FIG. 4 is a fragmentary internal schematic diagram of the first exemplary embodiment of the apparatus for cooling a pump illustrated in FIG. 2 in which the pump 5 of the apparatus is configured as a vertical pump. A vertical axis line 5 axis is shown in FIG. 4 to help illustrate the vertical orientation of the pump 5.

As may best be seen from FIGS. 2-4, the pump 5 can be arranged and configured to facilitate an improved cooldown operation so that the starting up of the pump 5 can occur in a relatively short period of time (e.g. less than five minutes, less than or equal to 2 minutes, less than or equal to 30 seconds, in a range of 15 seconds to 3 minutes or 5 seconds and 2.5 minutes, etc.). The cooldown operation can be performed so that the pump 5 can be started without venting downstream piping or flowing product through the pump 5 to atmosphere (although this functionality can still be provided via a pump venting conduit arrangement for use in the event it may be needed due to unexpected performance issues, a component failure, etc.). Such an improved cooldown operation can allow a fueling station to more quickly adapt to demand and allow for improved operations of a fueling station for more quickly filing a tank of a vehicle or otherwise allowing dispensers to be operated for filling of fuel tanks. We believe embodiments can also provide a substantial improvement in avoiding losses of hydrogen by significantly reducing losses of stored hydrogen that occur as compared to pump submergence approaches. Moreover, embodiments can also permit less higher pressure storage capacity to be needed or can permit the elimination of higher pressure storage.

A hydrogen feed conduit arrangement 4 can include conduits that fluidly connect the storage tank 3 to the pump 5 and the pump 5 to the FCM 7 and dispenser(s) 9. For example, the hydrogen feed conduit arrangement 4 can include a liquid feed conduit 4a connected between the storage tank 3 and a feed inlet 5a of the pump 5 to feed liquid hydrogen 3L to the pump 5. The hydrogen feed conduit arrangement 4 can also include a hydrogen gas supply conduit 4g that can be configured to receive hydrogen gas 3G within the storage tank 3 and output the hydrogen gas 3G to feed that hydrogen gas to the pump 5 to perform a pump cooldown operation.

In some embodiments, the pump 5 can have a feed inlet 5a that includes multiple supply inlets that include a gas supply inlet 4go that is in fluid communication with the gas supply conduit 4g and a liquid supply inlet 4ao that is in fluid communication with the liquid feed conduit 4a. In other embodiments (as indicated in broken line in FIG. 2), the pump 5 can include a feed inlet 5a that has a single supply inlet that is in fluid communication with the gas supply conduit 4g and the liquid feed conduit 4a. In embodiments having a single supply inlet, the gas supply conduit 4g can include a segment 9g (shown in broken line) that connects to the liquid feed conduit 4a so a mixture of liquid and gas or only the gas is passable to the pump 5 via a single pump feed inlet 5a. It should be appreciated that this segment 9g of the gas supply conduit 4g can also be present in embodiments that may utilize multiple supply inlets for the pump 5 to provide additional flow path options for cooldown operations or other operations as well.

A cooldown discharge conduit 4b can be connected to the pump 5 to facilitate venting of hydrogen to atmosphere so that hydrogen passed through the pump to perform a cooldown operation of the pump can be discharged to vent the cooldown hydrogen output from the pump 5 during the cooldown operation to atmosphere so that the cooldown operation hydrogen is not passed downstream from the pump 5 (e.g. is not passed downstream to the heat exchanger 6 or the FCM 7). The venting of hydrogen can also provide a pressure differential to help drive the flow of hydrogen from the storage tank 3 to the pump 5 and subsequently out of the pump for venting so that no other equipment may be required to help drive the flow of hydrogen for performing the cooldown operation for cooling the pump to a pre-selected operational temperature or maintain the pump at such a temperature.

A pump discharge conduit 4d of the hydrogen feed conduit arrangement 4 can connect the pump 5 to a heat exchanger 6 and FCM 7 so that liquid hydrogen output from the pump 5 via a pump discharge outlet 4d is passable through a heat exchanger 6 for warming to a desired pre-selected FCM feeding temperature within a pre-selected temperature range and subsequently be passed to the FCM 7 via an FCM feed conduit 4e of the hydrogen feed conduit arrangement 4 that can be connected between the heat exchanger 6 and the FCM 7. The pump discharge conduit 4d can be separate from the cooldown discharge conduit 4b. Hydrogen gas that is passed out of the pump via the cooldown discharge conduit 4b may not pass through a portion of the pump discharge conduit 4d. Also, hydrogen output from the pump 5 via the pump discharge conduit 4d does not pass through the cooldown discharge conduit 4b as the hydrogen passed to the pump discharge conduit 4d passes toward the FCM 7 and at least one dispenser 9.

The pre-selected temperature range can be a temperature that is near a temperature at which the fuel is to be dispensed into a fuel tank to help minimize heat of compression inside a vehicle fuel tank. In some embodiments, the pre-selected temperature range can be not less than −40° C. and not higher than 50° C., between −20° F. and −40° F. or between −25° C. and −40° C.

The hydrogen feed conduit arrangement 4 can also include a hydrogen bypass conduit arrangement 6bp that is connected to the pump discharge conduit 4d so that hydrogen can be vented to atmosphere via a venting conduit 4f as a secondary or backup means of pump cooldown and/or so a portion of the hydrogen can bypass the heat exchanger 6 via a heat exchanger bypass conduit arrangement 6bp for being used to mix with the hydrogen fed to the FCM 7 for maintaining the hydrogen with a desired temperature range before the hydrogen is passed to the FCM 7. The use of the bypass conduit arrangement for allowing a portion of the hydrogen to bypass the heat exchanger 6 can help reduce the load on the heat exchanger 6 to save on operational costs for maintaining the hydrogen with a desired pre-selected FCM feeding temperature range. For example, to provide such a bypass flow to bypass the heat exchanger 6, a control valve 4acv for downstream venting of the pump 5 and conduits can be closed while other valves within the bypass conduit arrangement 6bp are opened for a flow of a portion of the hydrogen to pass through the bypass conduit arrangement to bypass the heat exchanger 6 for subsequent mixing with the warmed portion of the hydrogen passed through the heat exchanger 6 and output from the heat exchanger 6.

Check valves 4cv can be positioned in the conduit arrangement 4. Each of the check valves 4cv can be configured to prevent hydrogen from flowing backwards in the hydrogen feed conduit arrangement so that after the hydrogen is passed through a check valve, it is prevented from flowing backwardly (e.g. upstream back toward the storage tank 3 or pump 5) from that check valve 4cv. For instance, at least one check valve 4cv can be positioned between the heat exchanger 6 and the pump 5 so that after the hydrogen is passed through the check valve, it cannot flow backwardly toward the pump 5. As another example, at least one check valve 4cv can be connected to the cooldown discharge conduit 4b so that hydrogen output from the pump 5 during a cooldown operation cannot flow back to the pump after it has passed through that check valve 4cv.

The hydrogen feed conduit arrangement 4 can also include adjustable control valves 4acv. The adjustable control valves 4acv can be adjusted between fully closed and fully open positions to guide the flow of fluid through the hydrogen feed conduit arrangement 4 along desired flow paths.

For example, a first adjustable control valve 4acv1 can be connected to the cooldown discharge conduit 4b and be opened to permit venting of hydrogen gas to atmosphere and to provide a pressure differential so that hydrogen gas and/or liquid passed out of tank can be fed to the pump 5 for performing a cooldown operation prior to starting pump operation for driving a liquid toward the FCM 7 and/or dispenser 9. A second adjustable control valve 4acv2 can be provided between the tank and the cooldown discharge conduit 4b and be kept closed when the first adjustable control valve 4acv is opened and be opened when the second first adjustable control valve 4acv is closed to permit hydrogen gas to be returned toward the tank 3 when the pump is operated to drive liquid hydrogen toward the dispenser 9 and/or FCM 7.

A bypass conduit arrangement 6bp can include a third adjustable control valve 4avc3, a fourth adjustable control valve 4avc4, and a fifth adjustable control valve 4acv5. The third adjustable control valve 4acv3 can be an unloader valve that can be opened to allow for venting of conduits between the pump 5 and the heat exchanger 6. For such venting, a fourth adjustable control valve 4acv4 can be in a closed position while a fifth adjustable control valve 4acv5 can be in an open position. The fifth adjustable control valve 4acv5 can be closed and the third and fourth adjustable control valves 4acv3 and 4acv4 can be opened to facilitate a flow of hydrogen that can bypass the heat exchanger 6 and be mixed back into the liquid output from the heat exchanger 6.

Temperature sensors TE can also be connected to the hydrogen feed conduit arrangement 4 and/or different units of the apparatus (e.g. pump 5, etc.). The temperature sensors TE can measure the temperature of the hydrogen within the conduits and/or pump 5 to monitor operation of the pump, the status of a cooldown operation, or other conditions in which the measured temperature can be relevant to an operation of the apparatus. In some embodiments, the temperature sensors can be thermocouples or other type of temperature sensors. Embodiments can also utilize flow sensors, pressure sensors, or other types of sensors to monitor operations for automated control of operations of the pump 5, valves of the conduit arrangement 4, and other units. Such sensors can be communicatively connected to a controller CTRL or other unit of an automated process control system so measurement data obtained from the sensors can be fed to the control system for monitoring operation and automatically controlling operations of the apparatus.

As may best be appreciated from FIGS. 3 and 4, the pump 5 can include a cylinder 5C and a moveable piston 5p. A moveable piston rod 5r can extend through the cylinder to the piston 5p to move the piston 5p so that it is adjustably positioned within a compression cavity 5cav via retraction or extension of a piston rod 5r to which the piston 5p is attached for increasing the pressure of hydrogen for feeding hydrogen from the storage tank 5 toward the one or more dispensers 9. A pump drive motor or other piston rod moving mechanism can be coupled to the piston rod 5r for driving motion of the piston 5p within the compression cavity 5cav. Hydrogen can be received at a pump inlet 5a and pass through a main feed inlet 5fi for being fed into the compression cavity 5cav. Compressed hydrogen fluid can be output from this cavity via the pump discharge outlet 4do that is connected to the pump discharge conduit 4d due to the motion of the piston 5p when the pump drive motor is activated and running to move the piston 5p. Liquid hydrogen can subsequently be received from the storage tank, fed into the compression cavity 5cav for undergoing compression therein and passed out of the compression cavity 5cav to the pump discharge outlet 4do via the pump discharge valve 5dv.

The pump 5 can also be configured to permit a flow of hydrogen gas to pass through the pump 5 during a cooldown operation. For example, hydrogen from tank 3 can be passed into the compression cavity 5cav to cool the pump so that hydrogen gas is passable into the compression cavity 5cav when the pump is off, or deactivated (e.g. piston 5p is not being moved via motion of the piston rod 5r driven by the pump drive motor for increasing the pressure of hydrogen for outputting the hydrogen via the pump discharge outlet 4do). Hydrogen can be output from the storage tank via opening of a valve connected to the cooldown discharge conduit 4b to vent hydrogen gas to the atmosphere. Hydrogen from the tank 3 can be output as hydrogen gas 3G via the hydrogen gas supply conduit 4g and/or liquid hydrogen via the liquid feed conduit 4a. The flow of hydrogen can be induced via the opening of the valve of the cooldown discharge conduit 4b for venting of the hydrogen.

The hydrogen passed into the pump 5 while the pump is off can pass into the compression cavity 5cav via main feed inlet 5fi as a cooldown inlet cooling flow 5cfi so that hydrogen gas can flow along a cooling path for cooling down of the pump to a desired operational temperature that is within a pre-selected operational temperature range. The hydrogen gas that is passed along this flow can be gas fed to the pump 5 as hydrogen gas 3G or gas generated by the liquid hydrogen 3L fed to the pump being warmed as it cools internal portions of the pump and/or feed conduits such that at least some of the liquid transitions to its gaseous state during the cooling down process and this gas that is formed can pass along the cooling path that includes the inlet cooling flow 5cfi that passes into the compression cavity 5cav for subsequently passing through other internal pump components before being passed out of the pump via the cooldown discharge conduit 4b for discharge to atmosphere via the venting.

The cooling path for cooling down of the pump to the desired operational temperature that is within a pre-selected operational temperature range can be defined so that the cooling flow of hydrogen gas passes from within the compression cavity 5cav and through the piston rings 5pr that are positioned adjacent the compression cavity 5cav to help seal the cavity. While the piston rings 5pr are positioned for providing a seal of the compression cavity 5cav between the moveable piston 5p and the compression cavity 5cav during operation of the pump via motion of the piston 5p within the compression cavity 5cav, the seal is not a complete seal for hydrogen gas and a flow of hydrogen gas can be flowable through the rings 5pr. Such a flow of hydrogen gas during the cooldown operation is shown as initial hydrogen cooling flow 5cfr in FIGS. 3 and 4, which is a cooling flow of hydrogen gas that can pass from the compression cavity 5cav and to the piston rings 5pr for providing a hydrogen gas cooling flow 5cf that moves along and through the piston rings during a cooldown operation. As the rings experience wear, the hydrogen gas can pass through the piston rings 5pr more easily than when the rings are in a newer, unworn state. When the piston 5p is not moved during a cooldown operation, the hydrogen gas can flow from the compression cavity 5cav and through the piston rings. The cooldown operational cooling flow path of hydrogen gas can pass through the piston rings and past the piston 5p along a segment 5cfp of the hydrogen cooling flow of the cooldown operation for passing along the piston rod 5r to be emitted from cooling flow outlet 4bo of the cooldown discharge conduit 4b as an outlet segment 5cfo of the cooldown operation cooling flow of hydrogen gas. The outlet flow of the hydrogen cooling flow for the cooldown operation can be passed from the cooling flow outlet 4bo to be vented to the atmosphere via the cooldown discharge conduit 4b.

The cooldown cooling flow of hydrogen gas can pass along the piston 5p and toward the cooling flow outlet 4bo of the cooldown discharge conduit 4b. Prior to passing through the cooling flow outlet 4bo, the cooling flow of hydrogen may pass to a non-compression side of the piston 5p as indicated by segment 5cfp of the hydrogen cooling flow path shown in FIGS. 3 and 4. The cooling flow outlet 4bo can be a cooling flow discharge outlet that is positioned so that the cooling flow of hydrogen gas passes from the non-compression side of the piston (e.g. beyond the piston 5p and adjacent a portion of piston rod 5r) before being output from the cooling flow outlet 4bo, which can be connected to the cooldown discharge conduit 4b for venting of the cooldown operation's cooling flow of hydrogen to the external atmosphere via the cooldown discharge conduit 4b.

In some embodiments, at least one cooling channel 5ci can be defined in the pump 5 such that a portion of hydrogen gas is passable from the feed inlet 5a of the pump 5 to other internal portions of the pump 5 via at least one cooling channel 5ci that is in fluid communication with the feed inlet 5a of the pump 5. The cooling channel(s) 5ci can be in fluid communication with an internal side of the cylinder 5C or other pump portion for cooling other portions of the pump via the hydrogen gas. In some embodiments, the cooling channel(s) 5ci can be at least one drilled passageway or other defined passageway so that a portion of hydrogen gas passed to the non-compression side of the piston 5p as indicated by segment 5cfp of the hydrogen cooling flow shown in FIGS. 3 and 4 can pass through the cooling channel 5ci for cooling other internal parts of the pump 5.

In some embodiments, at least one cooling channel 5ci can be utilized to supplement the flow of cooling hydrogen gas passed through the pump during the cooldown operation via the compression cavity 5cav to help cool other internal components of the pump more efficiently and quickly. In yet other embodiments, no internal cooling channel 5ci may be present or utilized.

Hydrogen utilized for cooling that is passed through the cooling channel 5ci can be output from the pump via the cooldown discharge conduit 4b and/or via a vapor return of the pump 5. For example, a flow of hydrogen gas can be passed through at least one cooling channel 5ci, which can extend from adjacent the piston rod 5r to a position that is adjacent a discharge valve 5dv of the pump and/or an internal discharge pathway for the discharge of hydrogen via a discharge outlet 4do that is in fluid communication with the pump discharge conduit 4d and discharge valve 5dv to which the discharge outlet 4do is in fluid communication. The hydrogen can subsequently be passed back into the compression cavity 5cav for being output via the cooldown discharge conduit 4b for venting to the atmosphere.

After the pump is activated and pump operations commence via motion of the piston rod 5r, blowby of the hydrogen gas back to the tank 3 during operation of the pump 5 can be provided by adjustment of a control valve 4acv to an open position after a valve 4acv for permitting venting out of the cooldown discharge conduit 4b is closed so that hydrogen gas can pass out of the pump 5 and back to the tank 3 via the cooldown discharge conduit 4b while the pump is activated. For example, in some embodiments control valves 4acv of the cooldown discharge conduit 4b can be adjusted to close a valve for venting and open a valve to permit hydrogen gas output via the cooldown discharge conduit 4b to pass hydrogen gas back to the tank 3 when the pump is activated to compress the liquid hydrogen to provide a blowby path of travel for the hydrogen gas.

In an alternative configuration, the pump 5 can be configured so that while the pump is activated to compress a fluid within the compression cavity 5cav, the hydrogen gas supply conduit 4g can provide a blowby for the hydrogen gas. In such a configuration, the valve of the cooldown discharge conduit 4b for venting can be closed so that the hydrogen gas blowby is passed internally through the pump to the hydrogen gas supply conduit 4g so that this conduit functions as a vapor return to the storage tank 3 while the pump 5 is activated to compress the liquid hydrogen and feed it toward the FCM 7.

As mentioned above, to help facilitate the flow of hydrogen from the tank 3 to the pump 5 for performing the cooldown operation, the pump may stay deactivated (e.g. the pump drive motor may be kept off or not running). An adjustable control valve of the cooldown discharge conduit 4b that is in fluid communication with the pump 5 and the storage tank 3 via the hydrogen feed conduit arrangement 4 can be opened to vent the tank 3 to the outside atmosphere. The opening of the valve for venting via the cooldown discharge conduit 4b (as indicated in FIG. 2 by the text "Vent") can adjust the pressure in the hydrogen feed conduit arrangement 4 so that hydrogen flows at a slow rate from the storage tank 3 to the pump feed inlet 5a for passing through the pump cavity 5cav along the hydrogen cooling flow path for the cooldown operation as discussed above before being vented via the cooldown discharge conduit 4b. Examples of such a slow rate can include 0.53 kg/hr+/−30%, a rate of 0.1 kg/hr to 0.8 kg/hr, or a flow rate that is 0.4 kg/hr to 0.6 kg/hr. As another example of a slow rate, some embodiments can utilize a flow rate that can be in the 0.1 kg/hr to 0.6 kg/hr range.

The flow of hydrogen can include hydrogen gas 3G via the hydrogen gas supply conduit 4g and/or a flow of liquid hydrogen 3L via the liquid feed conduit 4a. Control valves 4acv of these conduits can be opened while the vent control valve is opened to facilitate this flow of hydrogen to the pump 5 while the pump is deactivated for the cooldown operation.

As a result of the cooldown operation, a relatively small amount of hydrogen will be lost from the venting of the hydrogen to atmosphere. This loss of hydrogen, however, can be acceptable in view of the substantial decrease in time it may take for the quick startup of the pump 5 that can be provided by utilization of the cooldown process.

Further, the hydrogen utilized for the cooldown operation can be hydrogen gas 3G or can include hydrogen gas 3G that may otherwise need to be vented from the storage tank 3. The use of the hydrogen gas 3G for cooling in the cooldown operation prior to venting the gas 3G can provide a more efficient utilizing of this hydrogen gas 3G that is formed as a result of the storage of the liquid hydrogen within the lower pressure storage tank 3. This can further enhance operational efficiency by utilizing the hydrogen gas 3G for a useful operational purpose prior to venting that gas to atmosphere.

In some situations where it is anticipated that the pump 5 will be deactivated for a relatively long period of time, the cooldown operation can be performed by only use of the hydrogen gas 3G. Such an operation can result in the cooldown operation taking 1-3 hours of time in some embodiments. Once the pump is at the desired temperature, the cooldown operation can be maintained with use of a cooling flow of hydrogen gas 3G at a slow rate continuously or at periodic intervals. This can help keep the pump at a desired temperature near a projected time in which the fueling station demand is expected to be high while minimizing hydrogen losses by use of gas within the tank 3 that would otherwise need to be vented. This quick start feature can also be beneficial for other non-high demand situations. For instance, the quick start feature can be advantageous for feeding fuel to a vehicle fuel tank in a low demand situation as such a feature can help minimize, if not eliminate, a need for high pressure storage or other ground storage of hydrogen downstream from the pump.

In other situations, the cooldown operation can also utilize liquid hydrogen 3L. The liquid hydrogen fed to the pump 5 for the cooldown operation while the pump is deactivated can more quickly cool the pump to a desired operational temperature so that the cooldown operation is able to be performed more quickly (e.g. within 1-3 minutes, within 5 minutes, between 30 seconds and 3 minutes, between 30 seconds and 2 minutes, etc.). The use of the liquid hydrogen can be utilized for a cooldown operation at times when the demand at a dispenser is unexpectedly high after the pump has been deactivated for a sufficient period of time to have warmed to a temperature that is too high (e.g. higher than a temperature that can fall within the pre-selected operational temperature range). The liquid hydrogen 3L can be utilized in the cooldown operation alone or in combination with use of the hydrogen gas 3G. As discussed above, when liquid hydrogen is used, much of the liquid hydrogen can vaporize during the cooling down process as the liquid hydrogen is heated as it absorbs heat from the pump components and liquid feed conduit during the cooldown operation. The formed hydrogen gas, which is formed from the heating of the hydrogen liquid caused by the liquid hydrogen functioning as a cooling medium, can pass along the cooling path flow as discussed above.

Temperature sensors and other control elements that can be communicatively connected to a controller CTRL can be utilized to monitor and control cooldown operations. For example, a first temperature sensor TE can monitor the temperature of the hydrogen passed into the pump feed inlet 5a and a second temperature sensor TE can be positioned to monitor the temperature of the hydrogen that is being output to the atmosphere (e.g. vented) (e.g. a second temperature sensor TE connected to the cooldown discharge conduit 4b). The temperature measurement data from the first and second temperature sensors TE can be sent to a controller CTRL for evaluation of that data to monitor the cooldown operation for subsequent control of other valves and for activating the pump drive motor to start operation of the pump after the pump is at a sufficiently cold operating temperature within a pre-selected operational temperature range and there is demand for the hydrogen as fuel at one or more dispensers 9.

The controller CTRL can be a computer device having a processor connected to non-transitory memory and at least one transceiver for communications with the sensors and other elements of a plant and/or the apparatus. The controller can be configured to evaluate the temperature data received from the temperature sensors TE to determine a difference between the inlet temperature of the hydrogen fed to the pump 5 (e.g. a temperature determined from the data of a first temperature sensor TE positionable in the pump 5 or in a pump inlet 5a) for the cooldown operation and an outlet temperature of the hydrogen being passed for venting during the cooldown operation (e.g. temperature determined from the data of a second temperature sensor TE positionable in cooldown discharge conduit 4b or the cooling flow discharge outlet 4bo). When the difference in the inlet and outlet temperatures determined from the data received from the first and second temperature sensors is within a pre-selected pump operational temperature threshold (e.g. the difference is within 200° F. or 115° C., within 100° F. or 60° C., within 50° F. or 30° C., or within another suitable range) and the pump temperature is also determined to be at or below a pre-selected operational temperature (e.g. the first temperature sensor TE of the pump provides measurement data indicating that the pump temperature is at or below −200° F., at or below −300° F., at or below −350° F., at or below −400°

F., at or below −240° C., at or below −180° C., etc.), the pump 5 can be determined to be at a desired operational temperature for operation. This temperature verification process can be performed after it is determined by the controller CTRL that there is demand for liquid hydrogen at one or more dispensers 9 such that activation of the pump 5 is desired.

In response to this determination, the controller CTRL can communicate with other elements for adjusting valves 4*acv* of the hydrogen feed conduit arrangement 4 and actuation of other units of the apparatus. For instance, after the pump operational temperature condition is met, the cooldown operation can be ceased by closing the valve 4*acv* for venting the conduit arrangement 4 and the pump drive motor can be turned on for the pump 5 to start driving the flow of liquid hydrogen 3L out of the storage tank 3 through the pump 5 and through the pump discharge conduit 4*d* via pump discharge outlet 4*do* for feeding liquid hydrogen from the storage tank 3 toward the FCM 7 and dispenser 9 at an increased pressure.

The controller CTRL can send communications to the valves and pump 5 to automatically control this operation or the CTRL can be configured to cause a display of indicia related to this detected condition to be shown to an operator via a display communicatively connected to the controller CTRL to facilitate the operator using an input device to provide input to initiate the adjustment of valves and starting of the pump drive motor. In response to receipt of this input, the controller CTRL may then send communications for the adjustment of valves and activation of the pump drive motor, etc. so the demand for liquid hydrogen at the one or more dispensers can be met by feeding liquid hydrogen from the pump toward the dispensers.

For example, in response to determining that (i) there is demand for liquid hydrogen at a dispenser 9, (ii) the difference is within the pre-selected pump operational temperature threshold, and (iii) the pump temperature via a temperature sensor TE of the pump indicates the pump is at a temperature that is at or below a pre-selected operational temperature threshold, the controller CTRL can send communications for closing the valve of the cooldown discharge conduit 4*b* to cease venting of the hydrogen and turning on a pump drive motor to turn the pump 5 on for moving the piston 5*p* of the pump 5 within the compression cavity 5*cav* for feeding hydrogen from the storage tank 3 toward one or more dispensers 9. These communications can be sent automatically or after receipt of input from an operator.

The detection of the pump 5 being at a desired operational temperature for starting up of the pump after the cooldown operation is performed to meet demand for liquid hydrogen at a dispenser 9 can be adapted to meet a number of different sets of design criteria. In some embodiments, a distal measuring point 5*tp* of the temperature sensor TE can be positioned within the pump at a pre-selected detection location LDS. For a vertical pump, such as the pump 5 shown in FIG. 4, the pre-selected detection location LDS can be adjacent a bottom 5*btm* of the pump cylinder below the main feed inlet 5*fi* of the compression cavity 5*cav*. For a horizontal pump, such as the pump 5 shown in FIG. 3, the pre-selected detection location LDS can be adjacent a bottom 5*btm* side of the pump by a weir plate 5*wp* positioned adjacent the main feed inlet 5*fi* that is in fluid communication with the compression cavity 5*cav*. The weir plate 5*wp* can also be considered a weir baffle or other type of element within the pump that can be utilized to generate a known level-to-flow relationship. The distal measuring point 5*tp* can be positioned behind the weir plate 5*wp* such that the weir plate 5*wp* is between the measuring point 5*tp* of the temperature sensor TE within the pump 5 and the piston 5*p* located in the compression cavity 5*cav*.

For embodiments of the pump 5 that utilize liquid hydrogen for the cooldown operation, the position of the distal measuring point 5*tp* can be located so that this sensor measures temperature of liquid hydrogen that has accumulated at this pre-selected detection location LDS as a result of the cooldown operation flow of hydrogen. This detection can occur by the temperature sensor TE measuring the temperature of the hydrogen to be at a temperature associated with the temperature of liquid cryogenic hydrogen within the tank 3 (e.g. a temperature of −423° F., −253° C., −400° F., −240° C. or between −423° F. and −350° F. or between −253° C. and −180° C., depending on the calibration of the temperature sensor TE to operational conditions for the pump, etc.), for example. Once this detection occurs, the cooldown operation can be determined to have sufficiently cooled the pump 5 and the pump can be started.

After the pump 5 is sufficiently cooled and pump operations are to start, one or more valves of the cooldown discharge conduit 4*b* can be adjusted so that any hydrogen (e.g. hydrogen gas) that may pass through the piston rings 5*pr* during operation of the pump 5 can be output from the cooling flow discharge outlet 4*bo* and fed back to the storage tank 3 (instead of being vented) as discussed above.

When the pump is operating, the hydrogen received by the pump 5 via the pump feed inlet 5*a* can be compressed and subsequently output from the pump 5 via the pump discharge conduit 4*d* After being output from the pump 5, the liquid hydrogen can pass through a heat exchanger 6 to undergo warming therein before being fed to the FCM 7 via FCM feed conduit 4*e*. A warming medium can be passed through the heat exchanger 6 in concurrent flow or countercurrent flow to facilitate the warming of the hydrogen passed through the heat exchanger 6. The hydrogen can then be passed from the FCM to one or more dispensers 9.

When demand for hydrogen at the one or more dispensers 9 is low or stopped, the operation of the pump may be ceased (e.g. the pump can be deactivated). The pump 5 may be off for a long time and warm as it is off since there is no cryogenic temperature hydrogen passing through the pump. In the event the pump 5 is to be turned on again due to another increase in demand for hydrogen at one or more dispensers 9, the cooldown operation can be performed again before the pump drive motor is actuated to make sure the pump 5 is at a desired operational temperature before it is turned on for feeding hydrogen toward the FCM 7 and the one or more dispensers 9. The performance of the cooldown operation can occur prior to the turning on of the pump drive motor each time the pump 5 is to be activated (or reactivated) for flowing hydrogen to the FCM 7 and dispenser(s) 9.

Performance of embodiments of the pump cooldown operation utilizing embodiments of the pump 5 and embodiments of the apparatuses for cooling the pump 5 can allow the pump 5 to be cooled to a desired operational temperature without having to vent downstream piping or flowing hydrogen product through the pump 5 to atmosphere via the hydrogen bypass conduit 6*a* and venting conduit 4*f*. The downstream venting conduit 4*f* that is in fluid communication with the bypass conduit 6*a*, however, can be kept in embodiments of the apparatus to provide maintenance or emergency venting functionality to account for different issues that may arise during operations.

Embodiments of the pump cooldown operation utilizing embodiments of the pump 5 and embodiments of apparatuses for cooling the pump 5 can allow the pump 5 to be cooled to a desired operational temperature without requiring the pump to be submerged in cryogenic liquid hydrogen or always having liquid hydrogen passed through the pump in a continuous operation. This can improve energy utilization by avoiding constant running of a pump and avoid higher cost and maintenance issues associated with constant submergence of the pump or continuous running of the pump or flow of product through the pump when not necessary. Such pump submergence schemes can incur substantial losses due to substantial hydrogen boil off that occurs as the pump is kept submerged, for example. In contrast to pump submergence approaches, we believe embodiments of our apparatus and pump cooldown method can avoid significant hydrogen loss that can occur as a result of the submergence of the pump while the pump is not operational.

Embodiments of the pump cooldown operation utilizing embodiments of the pump 5 and embodiments of apparatuses for cooling the pump 5 can allow the pump 5 to reduce hydrogen losses by reducing the vented volume of hydrogen required for cooldown of the pump, facilitate quicker pump startup times with a pressurized discharge line to reduce hydrogen losses and reduce the startup time of the pump, allow for faster pump startup times for making the direct filling of vehicles at the dispensers 9 while also helping to minimize a need for gaseous storage or secondary precooling systems for a fueling station, and can also provide for efficient cooling by flowing the hydrogen along the cooling hydrogen gas discharge pathway internal to the pump.

We performed confidential experimentation and simulation of embodiments of our pump cooldown operation utilizing embodiments of our pump 5 and embodiments of our apparatuses for cooling the pump 5 and have found that the startup times can be less than two minutes (e.g. less than 30 seconds, less than 15 seconds, less than 5 seconds, between 5 seconds and two minutes, etc.) in some situations while in other extreme temperature situations at which the pump may have warmed to a high ambient temperature the startup time can range from 2-5 minutes. In other temperature conditions, the pump 5 was able to be sufficiently cooled in cooldown times that took less than 20 minutes, were within a range of 4-7 minutes, and were less than 5 minutes for different experiments that were conducted using different embodiments and different pump starting temperatures. Further, hydrogen losses can be reduced by more than 50% when compared to conventional cooldown operations, which can provide a significant operational improvement in reducing hydrogen losses.

It should be appreciated that embodiments of the apparatuses for cooling a pump that can be positioned and configured to facilitate hydrogen fuel dispensing and/or storage, the apparatus for pump cooling for cryogenic operation of the pump, embodiments of our pump cooldown operation prior to starting of the pump drive motor, and methods of making and using the same can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the apparatus, etc.).

Some of the exemplary embodiments discussed herein relate to utilization of hydrogen. Hydrogen is an example of a cryogenic fluid. Other embodiments of the pump 5 can be utilized with other types of cryogenic fluid (e.g. cryogenic liquid and/or cryogenic gas) instead of hydrogen gas and/or liquid hydrogen. For example, the storage tank 3 can retain another type of cryogenic fluid (e.g. cryogenic helium, cryogenic nitrogen, or cryogenic oxygen). In such embodiments, the pump discharge conduit 4d can feed the pumped liquid to a plant element for subsequent use instead of to a FCM 7 and/or dispenser 9. For such embodiments, the liquid feed conduit 4a can be considered a liquid cryogenic feed conduit 4a. In such embodiments, demand at a dispenser 9 may also not be a criteria for activation of the pump 5 via the controller CTRL. Instead, other control criteria can be involved in addition to the operational temperature evaluation criteria (e.g. demand for a cryogenic liquid or cryogenic fluid for a plant element or air separation unit element, etc.). It should therefore be understood that the hydrogen fueling station exemplary embodiment is an example and that other embodiments and uses are also contemplated in addition to use in hydrogen fueling station type environments. Embodiments can alternatively be utilized in air separation units, air separation plants, or other industrial plants that may utilize one or more cryogenic liquids or cryogenic fluids (e.g. cryogenic oxygen, cryogenic nitrogen, cryogenic helium, etc.). The cooling path for the pump cooldown operation discussed above with reference to hydrogen gas and/or liquid hydrogen can involve use of a different cryogenic gas and cryogenic liquid passing along such flow paths for these embodiments. For example, the cryogenic gas can be cryogenic nitrogen, oxygen, or helium gas instead of hydrogen gas for such embodiments. In such embodiments, the cryogenic liquid that is used via the pump can pass along the same flow paths and discharge of liquid hydrogen as discussed above. However, that cryogenic liquid may be passed to a different type of downstream unit instead of an FCM 7 and dispenser 9.

In such embodiments, the pre-selected temperature and pressure for the storage tank 3 may differ to account for the different cryogenic fluid (e.g. the temperature can be less than a boiling point for the fluid so the fluid is maintainable as a liquid). For example, for storage and pumping of liquid helium, the pre-selected temperature for storage may be a temperature that is less than or equal to −269° C. For embodiments where the cryogenic fluid is cryogenic nitrogen, the pre-selected temperature for storage can be less than or equal to −196° C. For embodiments where the cryogenic fluid is argon, the pre-selected temperature for storage can be less than or equal to −186° C. For embodiments where the cryogenic fluid is oxygen, the pre-selected temperature for storage can be less than or equal to −182° C.

It should also be appreciated that other modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the apparatus for fluid communication of the flows of fluid between different units can be arranged to meet a particular layout design that accounts for available area of the hydrogen fuel dispensing and/or storage system, sized equipment of the system, and other design considerations. As another example, the flow rate, pressure, and temperature of the fluid passed through the different elements of the apparatus as well as passed through other apparatus elements can vary to account for different cryogenic fluid storage and use system design configurations and other design criteria. As yet another example, the material composition for the different structural components of the apparatus can be any type of suitable materials as may be needed to meet a particular set of design criteria.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of our apparatuses for hydrogen storage and distribution, apparatuses for cooling a pump that can be positioned and configured to facilitate hydrogen fuel dispensing, apparatuses for pump cooling for cryogenic operation of the pump, cryogenic pumps, and methods of making and using the same have been shown and described above, it is to be distinctly understood that the invention is not limited thereto but may be otherwise variously embodied and practiced within the scope of the following claims.

What is claimed is:

1. An apparatus for hydrogen storage and distribution, comprising:
   a pump positioned to receive hydrogen from at least one storage tank;
   the pump having a pump discharge outlet for a pump discharge conduit through which liquid is passable out of the pump;
   the pump also having a compression cavity and a moveable piston moveable within the compression cavity, the pump also having piston rings positioned adjacent the compression cavity and the moveable piston;
   the piston rings and the compression cavity positioned and configured so that hydrogen gas is passable into the compression cavity while the piston is stationary and is passable from the compression cavity through the piston rings to a cooling flow outlet configured to be in fluid communication with a cooldown discharge conduit for venting the hydrogen gas to atmosphere;
   the at least one storage tank; and
   a hydrogen feed conduit arrangement comprising at least one of a liquid feed conduit connected between the at least one storage tank and a feed inlet of the pump to supply liquid hydrogen from the at least one storage tank to the pump and a hydrogen gas supply conduit connected between the at least one storage tank and a feed inlet of the pump to supply hydrogen gas from the at least one storage tank to the pump; and
   the cooldown discharge conduit connected to the pump so hydrogen gas passed through the cooling flow outlet is passable out of the pump and through the cooldown discharge conduit for being vented during a cooldown operation of the pump;
   the cooldown discharge conduit having an adjustable valve that is adjustable to an open position for venting the hydrogen during the cooldown operation of the pump while the pump is deactivated;
   a first temperature sensor connected to the pump to measure a temperature of hydrogen being fed from the at least one storage tank to the pump and/or a second temperature sensor connected to the cooldown discharge conduit to monitor a temperature of the hydrogen output from the pump for passing through the cooldown discharge conduit;
   a controller communicatively connected to the first temperature sensor and/or the second temperature sensor to determine a difference between the temperature of the hydrogen being fed from the at least one storage tank to the pump and the temperature of the hydrogen output from the pump and passing through the cooldown discharge conduit; and
   the controller configured to determine that the pump is at a temperature within a pre-selected operational temperature range and determine that the pump is activateable to feed hydrogen toward a dispenser in response to determining that the difference is within a pre-selected pump operational temperature threshold.

2. The apparatus for hydrogen storage and distribution of claim 1, wherein the controller is configured to adjust valves of the hydrogen feed conduit arrangement and communicate with a pump drive motor to turn the pump on in response to determining that the pump is at the temperature within the pre-selected pump operational temperature threshold and that the difference is within a pre-selected pump operational temperature threshold.

3. The apparatus for hydrogen storage and distribution of claim 1, wherein the pump includes an internal cooling channel positioned to pass a portion of hydrogen gas to internal pump components after the hydrogen gas has passed the piston while moving along a cooling flow path toward the cooling flow outlet.

4. The apparatus for hydrogen storage and distribution of claim 1, wherein the pump includes an internal cooling channel positioned to pass a portion of hydrogen gas to internal pump components after the hydrogen gas has passed the piston while moving along a cooling flow path toward the cooling flow outlet.

5. The hydrogen storage and distribution of claim 4, wherein the cooling channel is defined within a cylinder of the pump.

6. A method of performing a pump cooldown operation, comprising:
   opening a valve of a cooldown discharge conduit connected to a pump that is in fluid communication with a storage tank so that hydrogen within the storage tank is passable into a compression cavity of the pump while the pump is deactivated;
   passing the hydrogen from the storage tank and into the pump while a piston of the pump is stationary so that hydrogen gas passed into the compression cavity while the piston is stationary is passed from the compression cavity and through piston rings positioned adjacent the compression cavity and the piston;
   passing the hydrogen gas from the piston rings to the cooldown discharge conduit for being vented;
   monitoring a temperature of the hydrogen passing through a portion of the pump to measure a temperature of hydrogen being fed from the storage tank to the pump, wherein a first temperature sensor connected to the pump measures the temperature of the hydrogen passing through the portion of the pump;
   monitoring a temperature of the hydrogen output from the pump for passing through the cooldown discharge conduit, wherein a second temperature sensor connected to the cooldown discharge conduit measures the temperature of the hydrogen output from the pump for passing through the cooldown discharge conduit;
   a controller communicatively connected to the first temperature sensor and/or the second temperature sensor determining whether the pump is at or below a pre-selected pump operational temperature threshold; and in response to determining that the pump is at or below the pre-selected pump operational temperature threshold, the controller sending communications for closing the valve of the cooldown discharge conduit to cease venting of the hydrogen gas.

7. The method of claim 6, further comprising:

determining that the pump is cooled to a temperature that is within a pre-selected operational pump temperature range; and in response to determining that the pump is at the temperature that is within the pre-selected operational pump temperature range and also the controller determining that there is a demand for liquid hydrogen at a dispenser fluidly connected to the pump for fueling a vehicle, closing the valve of a cooldown discharge conduit to cease venting of the hydrogen gas and turning on a pump drive motor to turn the pump on for moving the piston of the pump within the compression cavity for feeding liquid hydrogen from the storage tank toward the dispenser.

8. The method of claim 6, further comprising:

determining a difference between the temperature of the hydrogen passing through the pump and the temperature of the hydrogen output from the pump and passed through the cooldown discharge conduit; and in response to determining that (i) the difference is within the pre-selected pump operational temperature threshold, (ii) that the temperature of the hydrogen passing through the pump is within a pre-selected pump operational temperature range, and (iii) also that there is a demand for liquid hydrogen at a dispenser fluidly connected to the pump for fueling a vehicle, closing the valve of the cooldown discharge conduit to cease venting of the hydrogen and turning on a pump drive motor to turn the pump on for moving the piston of the pump within the compression cavity for feeding liquid hydrogen from the storage tank toward the dispenser.

9. The method of claim 6, comprising:

in response to determining that the temperature within the pump is within a pre-selected operational temperature range, closing the valve of the cooldown discharge conduit to cease venting of the hydrogen gas and turning on a pump drive motor to turn the pump on for moving the piston of the pump within the compression cavity for feeding liquid hydrogen from the storage tank toward the dispenser.

* * * * *